Patented Mar. 29, 1927.

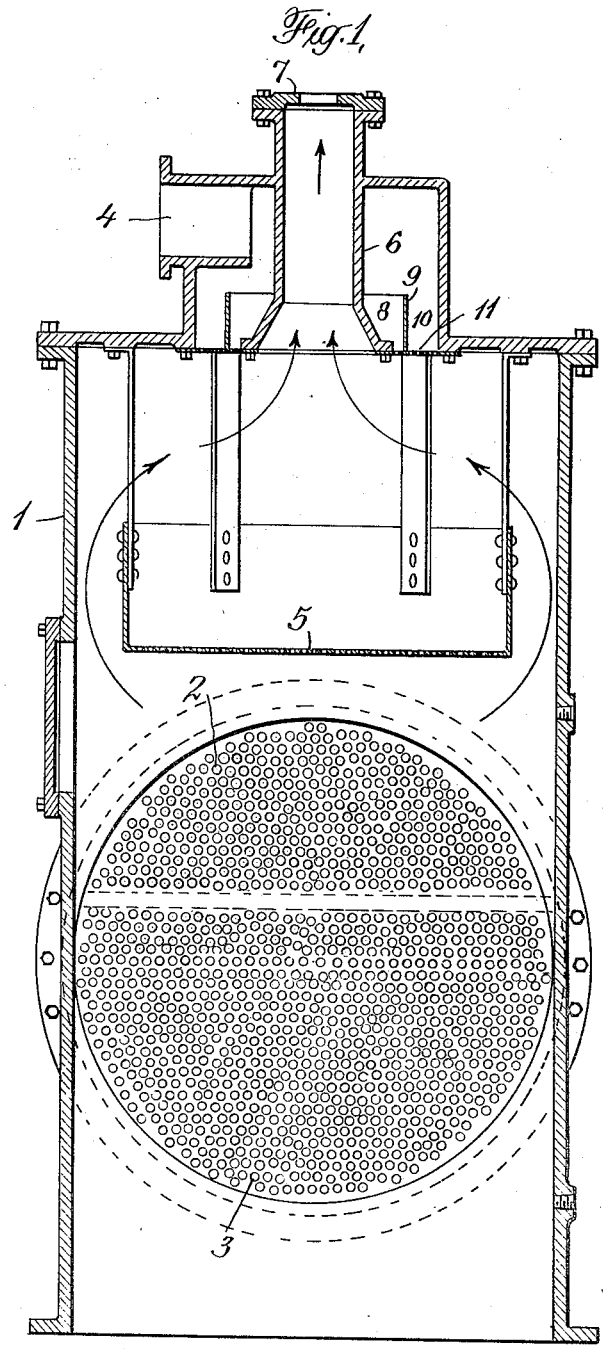

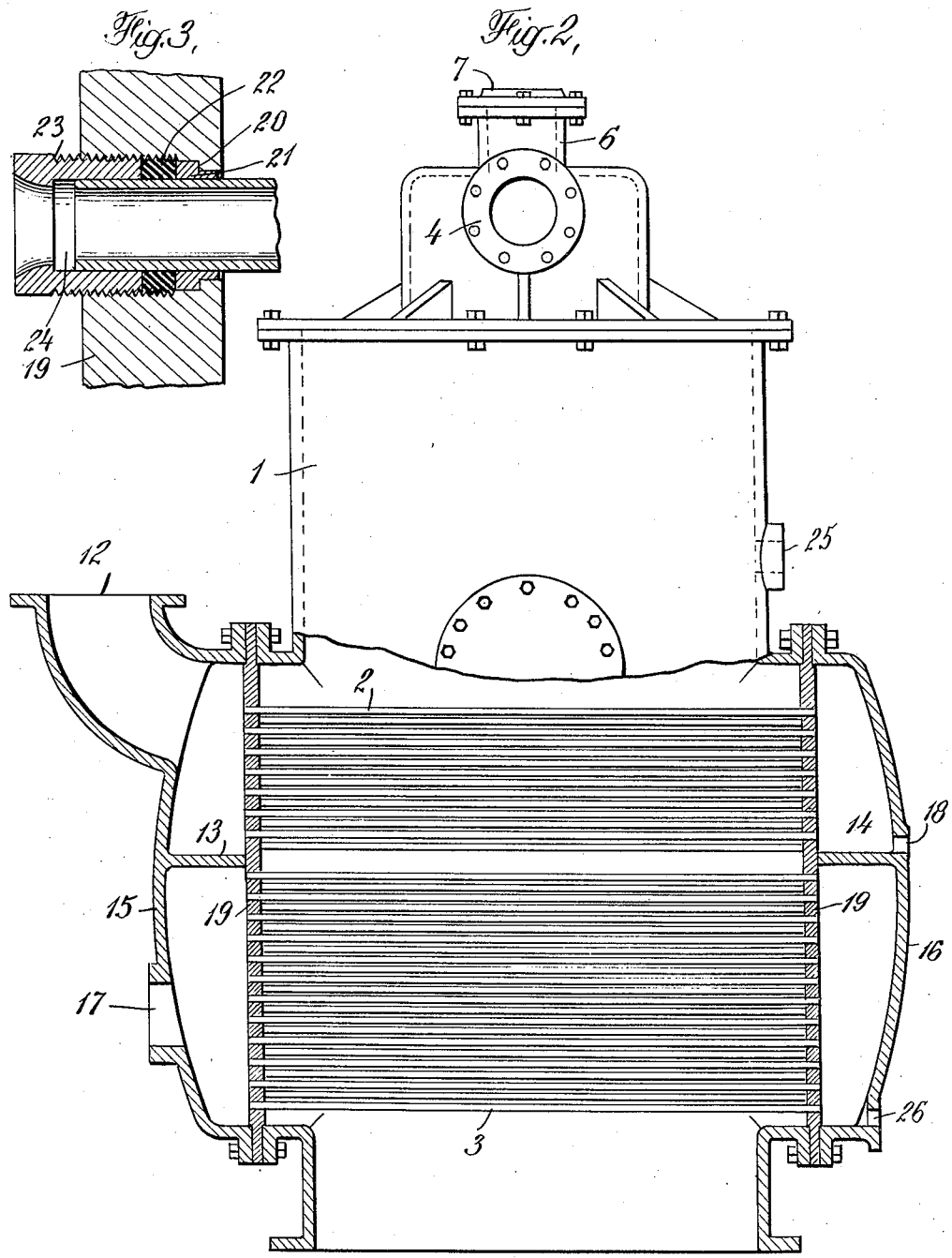

1,622,283

UNITED STATES PATENT OFFICE.

RUSSELL C. JONES, OF BRONXVILLE, NEW YORK, ASSIGNOR TO THE GRISCOM-RUSSELL COMPANY, OF NEW YORK, N. Y., A CORPORATION OF DELAWARE.

DEAERATOR.

Application filed May 24, 1924. Serial No. 715,718.

The present invention relates to apparatus for treating boiler feed water to eliminate its contained gases which if not removed pass to the boiler and give rise to corrosion and deterioration of the metal parts of the system.

The water ordinarily available for boiler feed in steam generating plants contains quantities of air and other gases in solution which cause a marked deterioration of the pipes and boilers if not removed from the raw water before it is utilized in the system. To overcome this difficulty, the feed water is usually deaerated before admission to the boilers. This deaeration may be accomplished by first heating the liquid to such an extent that the dissolved gases are liberated and then discharging the liberated gases from the system. The deaeration process as conducted commercially is frequently carried out under reduced pressure. The intent of a deaerating apparatus is to heat the liquid under treatment to a sufficient extent to remove substantially all of the contained gases and then to provide for the expulsion of such gases from the system with as little heat loss (such as by escaping steam) as is possible.

In modern steam generating plants much attention has been given to the complete and efficient utilization of all of the available heat in the system. In the deaeration process a certain amount of steam is necessarily evolved along with the uncondensible gases and in the designing of deaerating apparatus an effort is made to conserve the heat carried by this steam. It is the object of the present invention to provide a deaerating apparatus wherein the incoming liquid is distributed thru the apparatus as a curtain of falling rain or drops occurring in such fashion that the vapors arising from the body of liquid under treatment must pass thru it before reaching the outlet vent. To insure conservation of the steam evolved during the deaeration process the present invention provides for the maintenance of this curtain of falling liquid under all conditions of operation. The curtain of liquid completely obstructs the passage to the outlet whether the apparatus is operating at full load or whether it is operating at only a light load and demanding but a small supply of liquid to satisfy the requirements of operation. It is also the intent of the invention to so admit this quantity of incoming liquid that a uniform distribution over the tube surfaces will be accomplished at all loads.

It is a further object of the invention to provide for furnishing the heat for the deaeration process by means of the exhaust steam and other heat returns from the system without heat loss and to further provide for independently bringing separate bodies of heating medium into heat transferring relation with the liquid under treatment so that different steam sources may be used to the best advantage. This latter feature is of particular value where the steam sources available for furnishing the heat for the deaeration process are at different pressures or where one source of heating steam available is contaminated with impurities and another source available is pure steam which it is not desired to intermix with the impure heating medium. It is common commercial practice in steam generating plants to employ a "bleeder" turbine designed to deliver heating fluid from one or more of its intermediate stages. It thus frequently happens that the heating steam available for the deaeration process may be one or more sources of "bleeder" steam at different pressures and a supply of exhaust steam from the auxiliary apparatus at still another pressure. It is the intent of the invention to utilize these various sources of steam effectively by transferring separately to the liquid under treatment the heat from each of the individual sources of supply, thus avoiding the necessity of intermixing the different bodies of heating fluid.

It is also an object of the invention to provide a novel form of tube connection which permits easy removal of any of the heat transferring tubes even though the tube carries a considerable coating of accumulated scale.

I have illustrated a perferred embodiment of my invention in the accompanying drawings in which Figure 1 is a vertical sectional view illustrating my invention, this view being taken transversely to the tubes of the heating element; Figure 2 is an elevational view, partly in section, of the apparatus shown in Figure 1 taken longitudinally of the tubes of the heating element; and Figure 3 is a detail view of the tube connection.

Referring to the drawings, 1 indicates the containing shell or housing of the apparatus and 2 and 3 indicate the heating tubes grouped into a compact tube bundle positioned in the lower part of the shell as indicated in Figure 1. The raw incoming liquid is admitted thru the inlet 4 at the upper end of the apparatus and descends upon the tube bundle, the liquid being heated to the boiling point during its passage through the apparatus to thereby effect expulsion of its contained gases. A distribution plate 5 is arranged above the tube bundle to aid in securing a uniform distribution of liquid over the entire bundle of heating tubes. Vapors arising from the heating element are deflected to the outer edge of the space within the shell and make their way up thru outlet passage 6 to the gas discharge opening 7, as indicated by the arrows on Figure 1.

The raw liquid entering thru the inlet passage 4 is discharged into an annular chamber 8 formed between the outer wall of the gas discharge passage 6 and a vertical cylindrical partition 9 surrounding the base of the passage 6. A second annular chamber 10 is formed between the outer wall of partition 9 and the shell of the apparatus. A perforated plate 11 constitutes the bottoms of the chambers 8 and 10. As here shown, chamber 8 is in communication with only one ring of perforations in the plate 11 while chamber 10 is in communication with a much greater area of the plate 11 and consequently a much larger number of perforations. During the operation of the apparatus the liquid entering the inlet passage 4 is discharged into chamber 8 whereupon it will pass thru the perforations at the bottom of the chamber and will pass down into the apparatus as a closed ring of falling drops. Due to the fact that chamber 8 is in communication with only a small number of perforations the chamber will fill to overflowing and the overflow will be accommodated in chamber 10 and will pass down into the body of the apparatus thru the perforations in the bottom of that chamber.

The curtain of falling drops issuing from the chamber 8 and also the curtain of falling drops issuing from the chamber 10 descend in closed cylindrical conformation onto the distributing plate 5, from whence the liquid is distributed directly onto the tubes of the heating element. The gases and vapors evolved from the liquid falling upon the heating element rise thru the apparatus toward the outlet 7 in the manner indicated by arrows on Figure 1, and in thus passing out of the apparatus must necessarily pass thru the liquid curtains falling from the chambers 8 and 10. By this means the rising stream of gases and vapors are brought into direct contact with the incoming cold liquid and condensation of the vapors is effected.

When the apparatus is operating under light loads the amount of raw water supplied is small and it may be that no overflow to the chamber 10 will occur. The chamber 8, however, insures that a closed curtain of falling drops will be provided even at very light loads so that there will be no possibility of the vapors finding a passage out of the apparatus by means of which they may escape without coming into contact with the incoming liquid. If the partition 9 were not provided the incoming liquid would be immediately in communication with all of the perforations in the plate 11 at the point directly adjacent the inlet opening 4. With this situation the greater portion of the liquid at light loads would pass thru the perforations adjacent the inlet opening and it would be unlikely that sufficient liquid would find its way completely around the plate 11 to insure a closed ring of falling drops thru which the rising vapors must pass. By providing the two chambers 8 and 10, however, and arranging chamber 8 so that it is in communication with but a single ring of perforations, a closed curtain of falling drops is insured even at the lightest loads.

The tube bundle as herein shown is divided into two groups, 2 and 3. Heating steam is admitted to the group 2 of heating tubes thru the inlet 12, partitions 13 and 14 being provided in the respective headers 15 and 16 which enclose the opposite ends of the heating element to thereby form independent chambers in communication with the respective groups 2 and 3 of the heating tubes. The lower group 3 of tubes is supplied with heating steam thru an inlet opening 17. Discharge openings 18 and 26 are provided to convey off the condensate issuing from the respective groups. With this arrangement two independent compartments for the heating fluid are provided. "Bleeder" steam from a turbine at one pressure may for example be admitted to the group 2 of tubes and exhaust steam from the auxiliary apparatus at a different pressure may be admitted to the group 3 of tubes. In this way the available heat in the steam sources is transferred to the liquid in a single apparatus without necessity of intermixing the steam from the respective sources. Similarly a supply of impure steam may be passed thru say group 2 of the heating tubes and at the same time a supply of pure steam may be passed thru group 3, the liquid in the apparatus receiving the benefit of the heat contained in both sources of supply without necessitating intermixture of the two sources with a resultant contamination of the entire volume.

The heating tubes are supported in suitable tube sheets 19. In Figure 3 I have illustrated in detail a manner of securing the tubes in the tube sheets. The hole in the tube sheet 19 to receive the tube is made larger than the tube diameter and is provided with a shoulder 20 against which fits a ring 21. Adjacent the ring 21 is a body of packing material 22 held in place by a ferrule 23 threaded into the hole in the tube sheet. The tube has a sliding fit inside the ring 21 and the ferrule 23, and the ferrule has a cavity of sufficient length to provide a space 24 for expansion of the tube. The pressure exerted on the body of packing material 20 by reason of its compression between the ferrule 23 and the ring 21 serves to constitute a fluid tight joint. A principal advantage arising from the use of this connection is that the hole in the tube sheet is of larger diameter than the tube and thus permits withdrawal of the tube even though the tube carries a considerable deposit of scale.

It is evident that certain modifications of the structure shown may be made without departing from the scope of the appended claims. The structures illustrated represent preferred embodiments of the invention but may be somewhat modified to meet the conditions of a particular installation without, however, departing from the spirit of the invention. For instance, an auxiliary inlet 25 for heating may be provided as shown in Fig. 2. Steam may be introduced thru this opening directly into the space within the deaerator or hot drains may be introduced at this point under sufficient pressure to produce a flashing action with a corresponding deaerating effect upon admission of the liquid to the apparatus.

I claim:

1. Deaerating apparatus of the class described comprising a containing shell for the liquid being treated, means for heating the liquid to expel the gases contained therein, an inlet for admitting untreated liquid, means for accommodating a portion of said incoming liquid and distributing it in the apparatus as a curtain of falling rain, means for distributing that portion of the liquid not accommodated by said first mentioned distributing means, an outlet for permitting escape of the expelled gases and means for directing the stream of evolved gases and vapors thru said falling curtain of incoming liquid to thereby condense said vapors and prevent escape thereof.

2. Deaerating apparatus of the class described comprising a containing shell for the liquid being treated, means for heating the liquid to expel the gases contained therein, an inlet for admitting untreated liquid, a chamber for accommodating a portion of said incoming liquid, discharge openings in said chamber for directing liquid therefrom through the apparatus as a curtain of falling rain, a second chamber for receiving that portion of the liquid not accommodated by said first mentioned chamber, discharge openings in said chamber for directing liquid therefrom through the apparatus as a curtain of falling rain, an outlet for permitting escape of the expelled gases and means for directing the stream of evolved gases and vapors through said falling curtain of incoming liquid to thereby condense said vapors and prevent escape thereof.

3. Deaerating apparatus of the class described comprising a containing shell for the liquid being treated, means for heating the liquid to expel the gases contained therein, an inlet for admitting untreated liquid, a chamber for receiving the incoming liquid, said chamber having a bottom perforated to effect distribution of liquid through the apparatus as a curtain of falling rain, a second chamber for receiving the overflow from said first mentioned chamber, said second chamber having a perforated bottom for discharge of liquid therefrom, an outlet for permitting escape of the expelled gases and means for directing the stream of evolved gases and vapors through said falling curtain of incoming liquid to thereby condense said vapors and prevent escape thereof.

4. Deaerating apparatus of the class described comprising a containing shell for the liquid being treated, means for heating the liquid to expel the gases contained therein, an inlet for admitting untreated liquid, an outlet passage for expelled gases, a chamber surrounding said outlet passage for receiving the incoming liquid, said chamber having a bottom perforated to effect distribution of liquid through the apparatus as a curtain of falling rain, a second chamber surrounding said first mentioned chamber for receiving the overflow from said first mentioned chamber, said second chamber having a perforated bottom for discharge of liquid therefrom, and means for directing the stream of evolved gases and vapors through said falling curtain of incoming liquid to thereby condense the said vapors and prevent escape thereof.

5. Deaerating apparatus of the class described comprising a containing shell for the liquid being treated, means for heating the liquid to expel the gases contained therein, an inlet for admitting untreated liquid, an outlet passage for expelled gases, a chamber surrounding said outlet passage for receiving the incoming liquid, said chamber having a bottom perforated to effect distribution of liquid through the apparatus as a curtain of falling rain, a second chamber surrounding said first mentioned chamber for receiving the overflow from said first mentioned chamber, said second chamber having a perforated bottom for discharge of liquid therefrom, a distributing plate for receiving the liquid discharged from said chambers and distributing said liquid over the heat transferring surfaces, and means for directing the stream of evolved gases and vapors through said falling curtain of incoming liquid to thereby condense said vapors and prevent escape thereof.

6. Deaerating apparatus of the class described comprising a containing shell for the liquid being treated, means for heating the liquid to expel the gases contained therein, an inlet for admitting untreated liquid, a plurality of cooperating chambers for accommodating the incoming liquid, one of said chambers being adapted to distribute through the apparatus as a curtain of falling rain a relatively small quantity of liquid and discharge the overflow into a cooperating chamber, whereby said curtain of falling liquid will be completely established at all ranges of operating load, and means for directing the stream of evolved gases and vapors through said falling curtain of incoming liquid to thereby condense out said vapors and prevent escape thereof.

7. Apparatus for treating liquids comprising a containing shell, a heating element for bringing a heating fluid into heat transferring relation with the liquid being treated, means dividing the said heating element into a plurality of independent passages whereby different sources of heating fluid may be utilized in the apparatus without intermixture of said fluids and an inlet for heating fluid from a third source directly into the said shell.

8. Deaerating apparatus of the class described, comprising a containing shell for the liquid being treated, a heating element comprising a tube bundle for conveying heating fluid, said tube bundle being divided into two independent compartments whereby steam from different sources and at different pressures may be utilized as heating medium, an inlet for admitting untreated liquid, means for accommodating said incoming liquid and distributing it in the apparatus as a curtain of falling rain, an outlet for permitting escape of the expelled gases and means for directing the stream of evolved gases and vapors thru said falling curtain of incoming liquid to thereby condense said vapors and prevent escape thereof.

9. Apparatus for treating liquids comprising a containing shell, a heating element for bringing a heating fluid into heat transferring relation with the liquid being treated, said heating element being divided into a plurality of independent passages, a header at one end of said heating element having a plurality of chambers for distributing heating fluid into the respective portions of said heating element, a heater at the other end of said heating element for receiving the discharge from the respective portions of the heating element and maintaining the fluid discharged from said respective passages separate and an inlet for heating fluid from a third source directly into the said shell.

10. An apparatus for treating liquids comprising a containing shell for the liquid to be treated, a heating element comprising tubes extending transversely of said shell, circular tube sheets in the walls of said shell and in which said tubes are mounted, said tubes being arranged in two groups divided by imperforate portions of said tube sheets and circular headers at each end of said tube sheets, said headers having partitions dividing them into two compartments, respectively, said partitions coacting with said imperforate portions of said tube sheets, thereby forming separate inlet and outlet chambers for each group of tubes.

In testimony whereof I affix my signature.

RUSSELL C. JONES.